(No Model.)
L. D. LOWTHER.
WINDMILL.
No. 259,563. Patented June 13, 1882.
Fig. 1.
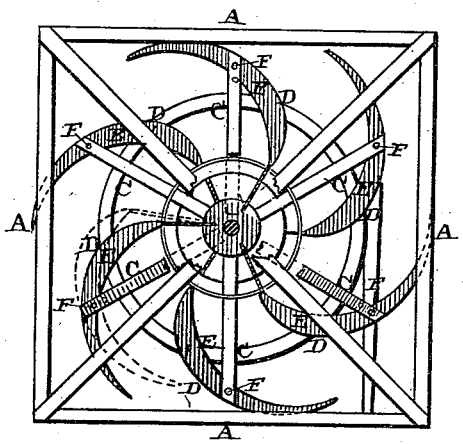
Fig. 3.
Fig. 2.
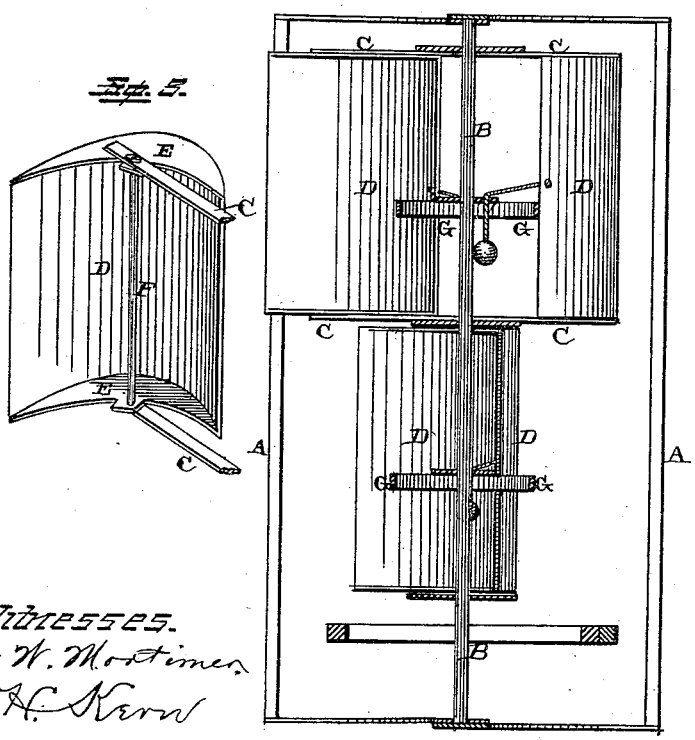
Witnesses.
H. W. Mortimer
W. H. Kerr
Inventor:
L. D. Lowther,
per
F. A. Lehmann,
Atty.

UNITED STATES PATENT OFFICE.

LORENZO D. LOWTHER, OF SEGUIN, TEXAS.

WINDMILL.

SPECIFICATION forming part of Letters Patent No. 259,563, dated June 13, 1882.

Application filed February 14, 1882. (No model.)

*To all whom it may concern:*

Be it known that I, L. D. LOWTHER, of Seguin, in the county of Guadalupe and State of Texas, have invented certain new and useful Improvements in Windmills; and I do hereby declare the following to be a full, clear, and exact description of the invention, such as will enable others skilled in the art to which it pertains to make and use it, reference being had to the accompanying drawings, which form part of this specification.

My invention relates to an improvement in windmills; and it consists in the combination of a central vertical shaft, a series of supporting-arms projecting horizontally out from this shaft, a number of curved buckets which are pivoted at or near their centers between these supporting-arms, and suitable springs or weights which are attached to the inner edges of these buckets, as will be more fully described hereinafter.

The object of my invention is to provide a horizontal windmill composed of two or more tiers of buckets which are placed in such relation to each other that one of the buckets is always taking the full force of the wind, and which are made to automatically regulate the speed at which the mill shall run.

Figure 1 is a plan view of my invention. Fig. 2 is a vertical section of the same. Fig. 3 is a detail view of the bucket which is used to speed the mill.

A represents a suitable rectangular frame of any desired height, in which is journaled the vertical shaft B. Extending outward from this shaft are a number of horizontal supporting-arms, C, the number of these arms being regulated by the number of tiers of buckets and the number of buckets used. Pivoted at or near the outer ends of these supporting-arms are the buckets D, which are made of the shape here shown, and which are provided with the horizontal curved flanges E at each of their ends. These flanges serve not only to hold the wind, but also as a means for passing the pivotal rods F through, whereby the buckets are pivoted between the supporting-arms. Also, secured to the shaft near the center of each tier of buckets is the ring G, against which the inner ends of the buckets bear as the wheel revolves. This wheel serves as the bearing-point for the inner edge of each bucket as long as the wind does not exceed a certain force; but should the wind exceed a certain force this inner end of the bucket, being more curved than the outer end, and receiving the full power of the wind before the wind sensibly affects the outer end of the bucket, will give backward upon its pivot, and thus let a portion of the force of the wind pass by without affecting it. For the purpose of making these buckets self-regulating the inner end of each bucket has a spiral spring, a weight, or any other suitable device attached to it, and which spring, weight, or device connects the inner end loosely to the shaft or a collar, sleeve, or flange placed upon it. When the power of the wind exceeds a certain force the inner end of the bucket gives backward before it; but as soon as the power of the wind decreases, or the bucket has passed on around where the wind does not act sensibly upon this inner end, the spring or weight draws the end back into position against the central ring. By this means the spring, weight, or other device may be regulated so that the speed of the wheel will never exceed a certain limit.

Any desired number of these buckets may be used in a tier, though only three are here shown; and when two or more tiers are used, as will generally be the case, the buckets are placed in such relation to each other that one of them is always taking the full power of the wind while the one which has just been acted upon is gradually moving back out of the wind. In this way the wheel is always being acted upon by the full power of the wind, and hence the mill will run under a very light wind, and will give the best possible results with the very least amount of friction and wear. After one of the buckets is moved back out of the wind its inner curved edge gradually moves around against the wind in such a manner that the smallest possible portion of it is affected by the wind until the bucket reaches that point where it forms no resistance whatever to the revolution of the wheel, and then the back convex side of the bucket is exposed for an instant before it moves around and begins to take the wind again.

Whenever it is desired a suitable ring or wheel will be secured to the shaft, and the pivoted lever will then have its inner shorter end made to bear against the periphery of this wheel, and thus either stop its movement entirely, when so desired, or to cause the wheel to revolve very slowly. Of course when this wheel is at work this lever will not be brought into play; but by pulling upon this outer end at any time the wheel can be instantly stopped or its power checked.

Having thus described my invention, I claim—

In a horizontal windmill, the combination of the vertical shaft, the supporting-arms projecting out from the shaft, the curved buckets pivoted between the arms, the central ring, against which the inner ends of the buckets bear, and a spring or weight for making the bucket self-adjusting, substantially as set forth.

In testimony whereof I affix my signature in presence of two witnesses.

LORENZO DOW LOWTHER.

Witnesses:
W. P. H. DOUGLASS,
HENRY MANEY, Sr.